(12) United States Patent
Vaucher et al.

(10) Patent No.: US 9,815,580 B2
(45) Date of Patent: Nov. 14, 2017

(54) APPARATUS AND METHOD FOR PACKING BULK MATERIAL INTO A CONTAINER

(71) Applicant: Bühler AG, Uzwil (CH)

(72) Inventors: Christophe Vaucher, Niederuzwil (CH); René Haid, Oberuzwil (CH); Andreas Kleiner, Niederhelfenschwil (CH)

(73) Assignee: Bühler AG, Uzwil (CH)

( * ) Notice: Subject to any disclaimer, the term of this patent is extended or adjusted under 35 U.S.C. 154(b) by 376 days.

(21) Appl. No.: 14/379,813

(22) PCT Filed: Feb. 20, 2013

(86) PCT No.: PCT/EP2013/053383
§ 371 (c)(1),
(2) Date: Sep. 11, 2014

(87) PCT Pub. No.: WO2013/124319
PCT Pub. Date: Aug. 29, 2013

(65) Prior Publication Data
US 2015/0033677 A1    Feb. 5, 2015

(30) Foreign Application Priority Data
Feb. 20, 2012    (EP) .................................... 12156220

(51) Int. Cl.
*B65B 1/06* (2006.01)
*B65B 43/30* (2006.01)
(Continued)

(52) U.S. Cl.
CPC ............. *B65B 43/30* (2013.01); *B25J 11/005* (2013.01); *B25J 15/0616* (2013.01); *B65B 1/06* (2013.01); *B65B 43/18* (2013.01); *B65B 43/465* (2013.01)

(58) Field of Classification Search
CPC ..... B25J 15/0616; B25J 11/005; B65B 43/18; B65B 43/30; B65B 43/465; B65B 1/06
(Continued)

(56) References Cited

U.S. PATENT DOCUMENTS 3,830,266 A   8/1974 Hudson
5,140,801 A *  8/1992 Wild ........................ B65B 43/30
                                                          141/157
(Continued)

FOREIGN PATENT DOCUMENTS

EP    0016691    10/1980
EP    0176477    4/1986
(Continued)

*Primary Examiner* — Nicolas A Arnett
(74) *Attorney, Agent, or Firm* — Davis & Bujold PLLC; Michael J. Bujold

(57) ABSTRACT

The apparatus (1) according to the invention for packing bulk material into a container (2) comprises a provisioning device (3) for the container (2). The container (2) has a filling side with a filling opening arranged therein. The apparatus (1) further comprises a gripping device (4) for gripping of the substantially closed and empty container (2) by the provisioning device (3). The apparatus optionally comprises a conveying device (5) for conveying the container (2) to a packing device (6). The apparatus further optionally comprises a container-opening device (9) for opening the container (2). The gripping device (4) has a detection device (7) for detecting the position of the container on and/or in the provisioning device (3). The apparatus (1) additionally has a positioning device for positioning the container on the basis of said detected position.

22 Claims, 6 Drawing Sheets

Figure 1:
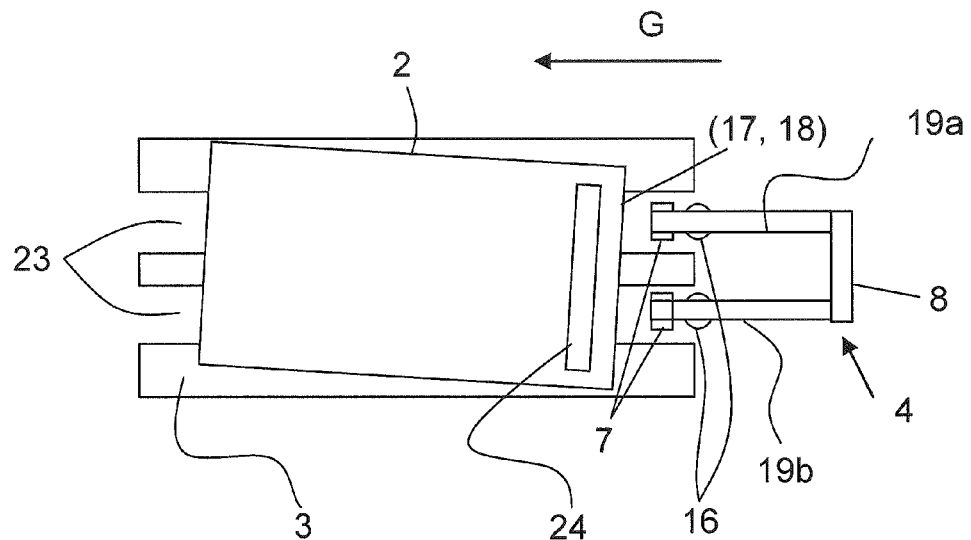

(51) Int. Cl.
  *B65B 43/18* (2006.01)
  *B65B 43/46* (2006.01)
  *B25J 11/00* (2006.01)
  *B25J 15/06* (2006.01)

(58) Field of Classification Search
  USPC .................. 141/1, 10, 94, 114, 313–317
  See application file for complete search history.

(56) References Cited

U.S. PATENT DOCUMENTS

| | | | | |
|---|---|---|---|---|
| 5,327,947 | A * | 7/1994 | McGregor | B65B 1/08 |
| | | | | 100/145 |
| 5,452,567 | A * | 9/1995 | Lieder | B65B 43/30 |
| | | | | 141/166 |
| 5,771,665 | A * | 6/1998 | Nelson | B65B 43/56 |
| | | | | 141/10 |
| 8,490,367 | B2 * | 7/2013 | Actis | A01F 25/14 |
| | | | | 53/235 |
| 9,266,628 | B2 * | 2/2016 | Kleiner | B65B 1/12 |
| 9,352,860 | B2 * | 5/2016 | Vollenkemper | B65B 43/465 |
| 2004/0055250 | A1 | 3/2004 | Main et al. | |
| 2007/0204570 | A1 * | 9/2007 | Okazaki | B65B 59/02 |
| | | | | 53/459 |
| 2013/0186515 | A1 * | 7/2013 | Kleiner | B65B 1/12 |
| | | | | 141/12 |

FOREIGN PATENT DOCUMENTS

| | | | |
|---|---|---|---|
| EP | 0371955 | 6/1990 | |
| EP | 1645512 | 4/2006 | |
| EP | 1832517 A1 * | 9/2007 | ........... B65B 43/465 |
| EP | 2014558 | 1/2009 | |
| EP | 2208678 | 7/2010 | |
| EP | 2246264 | 11/2010 | |
| GB | 2199801 | 7/1988 | |
| JP | 5-124751 | 5/1993 | |
| WO | 99/14127 | 3/1999 | |
| WO | 03/089349 | 10/2003 | |

* cited by examiner

APPARATUS AND METHOD FOR PACKING BULK MATERIAL INTO A CONTAINER

The invention relates to an apparatus and a method for packing bulk material into a container according to the preamble of the independent claims.

Apparatuses for packing bulk material, such as flour, into a plastics container are known from WO 2010/052325 A1. The disclosed apparatus relates to a bagging carousel, as these are today known to the person skilled in the art.

A method and an apparatus for automatic bag supply and bag attachment of a stack of bags is known from WO 92/12900 A1. The bags are partially opened by means of two pairs of adhesion claws having suction cups, wherein the adhesion claw pairs are attached to a swivel arm for the opened transfer of a bag from the bag supply facility to the bagging spout. The bag opening claws are positioned by means of a hydraulic or pneumatic lever joint into predefined positions. For the reliable supply of the bags, the use of a plurality of cup-shaped bag magazines is proposed.

This previously known solution for the bag supply and bag opening has the drawback that the bag supply in magazines, at least in the case of flexible bags, demands a certain amount of care, which is complex and therefore uneconomical during operation. Moreover, the previously known apparatus has the drawback that, when the bag is opened into predetermined positions by means of the pneumatically openable adhesion claw pairs, the bag can easily fall off, which, during operation, leads to further extra work for the operator, which reduces the throughput through the apparatus for bulk material packing and is therefore not cost-effective.

It is therefore an object of the present invention to avoid the drawbacks of the prior art, in particular, therefore, to provide an apparatus and a method with which the requirements of the positioning accuracy of the container in the course of supply are lessened for a more reliable closure of the container following packing and, optionally, the reliability of the gripping of the container is increased.

These objects are achieved by an apparatus and a method according to the independent claims.

The inventive apparatus for packing bulk material into a container comprises a supply device for the container. The container has a fill side having a fill opening disposed therein. The apparatus further comprises a gripping device for grabbing the substantially closed and empty container from the supply device. Optionally, the apparatus comprises a transport device for transporting the container to a bagging device. In particular, the apparatus further comprises a container opening device for opening the container. The apparatus has a detection device for detecting the position of the container on and/or in the supply device. In particular, the detection device is disposed on the gripping device. In addition, the apparatus has a positioning device for positioning the container as a function of the detected position. In particular, the positioning is an alignment of the container.

By the term "bulk material" is understood, within the meaning of the present application, a product which is packable into a container. In particular, bulk material is a granular, floury or lumpy product, which is preferably present in a pourable form and, in particular, is flowable. In particular, flour, grain, flowable, powdery substances, and any chosen combinations thereof, are construed as bulk material.

By the term "container" is understood, within the meaning of the present application, a receptacle having at least flexible side walls. For instance, within the meaning of the present invention, a bag is a container. The container has a fill opening, for instance for the feed-in of bulk material. That region of the container in which the fill opening is disposed is referred to as the fill side. A substantially closed and empty container is pressed flat, for instance, for which reason it should advantageously be opened prior to filling with bulk material. Substantially closed and empty containers of this type are stackable, wherein the containers lie, for instance, on the side walls and can be positioned from the stack onto the supply device, for instance with a separating device.

For instance, a container made of plastic, for instance polyester, paper, or any chosen combinations thereof, can be produced.

By a "supply device" is understood, within the meaning of the present application, a device by which the substantially closed and empty container is gripped by the gripping device. For instance, the supply device can be designed as a support surface, onto which a container is respectively positioned by an operator and is subsequently gripped by the gripping device. Preferably, precisely one container is respectively supplied. In particular, the simultaneous supply of at least two containers, for instance a stack of containers, is possible.

By a "transport device" is understood, within the meaning of the present application, a device for moving the gripped container from the supply device to a bagging device.

By a "container opening device" is understood, within the meaning of the present application, a device with which a substantially closed and empty container can be opened for packing of bulk material into the container. By means of the container opening device, the fill opening of a substantially closed and empty container can be opened on the fill side. The fill opening of the container can thus be opened, for instance, by moving apart of the opposite side walls.

By a "positioning device" is understood, within the meaning of the present application, a device with which deviations from a standard position of the container, for instance on the supply device, are correctable in order to ensure reliable packing and closure of the container after the packing. Such deviations of the position of the container from a standard position can be generated, for instance, by the positioning of the container on the supply device by an operator or a separating device with which the container of a container stack is positioned on the supply device. By means of the positioning device, a deviation from a standard position on the supply device can thus be corrected in the transport from the supply device to the bagging device, or in the bagging device.

For instance, the detected position can be at least relayed by means of a data processing device, in particular a computer, and communicated to the positioning device, so that the positioning device can position the container on the basis of these data. In particular, the detected position is stored in the data processing device.

By a "standard position", which is, in particular, a predefinable and/or predefined position, is understood that position of the container on the supply device with respect to which no correction of the position is necessary.

The design of an apparatus for packing bulk material into a container with a detection device and a positioning device has the advantage that deviations from a standard position of the container on and/or in the supply device are correctable for reliable gripping of the container and also for reliable packing of bulk material into the container and subsequent closure. This design therefore demands a lesser positioning accuracy of the container on and/or in the supply device by an operator. This leads to a more reliable, more efficient and thus more economical process.

For instance, the container can be gripped by means of the gripping device without detection and correction of the position of the container such that the bulk material is not reliably conveyed in the bagging device into the container. Moreover, this can result in unreliable closure of the container following packing, for instance by means of an adhesive strip placed on the container, since the container can be wrongly positioned.

Preferably, the alignment of the fill side of the container, in particular the alignment of the edge, is detected by means of the detection device.

Preferably, the detection device is configured as a distance measuring device, as an optical sensor, as a marking detector or as a contact measuring device, or any chosen combinations thereof. In particular, the distance measuring device is configured as an ultrasonic sensor.

The use of a distance measuring device has the advantage that this is economical and operationally reliable where various materials are used. A distance measurement by means of a distance measuring device, such as an ultrasonic sensor, is known to the person skilled in the art.

For instance, the position of the container can be determined by means of two distance measuring devices which are spaced apart on the gripping device; when the gripping device for gripping the container is moved to the container, the edge of the container is detectable by means of the distance measuring devices; by means of the known information with respect to the position of the distance measuring devices on the gripping device, the time-dependent position of the gripping device and the respective time of detection of the edge of the container by the distance measuring devices, the alignment of the container on the supply device is able to be determined.

The use of an optical sensor, such as a photoelectric cell or a camera, has the advantage that a better and more accurate detection of the position of the container is possible. By means of the optical sensor, the alignment of the fill side of the container, in particular the alignment of the edge, can be detected, for instance.

An optical sensor such as a camera can be positioned, in particular in the apparatus, relative to the supply device such that the position of the container is detectable; the detection of the position of the container can be realized with image processing algorithms, known to the person skilled in the art, with respect to the images recorded with the camera; in the present arrangement, the camera is preferably disposed in the apparatus separate from the gripping device.

The use of a contact measuring device to detect the position, by means of which, for instance, the alignment of the fill side of the container, in particular the alignment of the edge, can be detected, has the advantage that this detection can be reliably performed regardless of the material.

By a "marking detector" is understood, within the meaning of the present application, a detector for detecting at least one marking on and/or in the container.

The use of a marking detector has the advantage that a marking disposed on and/or in the container is selectable in accordance with the respective requirements, such as costs, accuracy and reliability.

For instance, it is possible to provide as the marking at least an optical marking, a magnetic marking or a tactile marking, or any chosen combinations thereof.

An optical, magnetic or tactile marking and the marking detector are advantageously configured such that the position of the container is detectable and this information can be used to correct the position of the container by means of the positioning device.

Particularly preferably, the gripping device is designed such that the container, which rests on the supply device, is grippable on the supporting side by means of the gripping device. Alternatively or additionally, the container can be gripped on a top side by means of the gripping device.

By the "supporting side" of the container is understood, within the meaning of the present application, that region of the side wall of the container which is facing toward the supply device. The term "top side" of the container comprises that region of the side wall of the container which is facing away from the supply device. In particular, the top side is situated opposite the supporting side.

The grippability of the container by means of the gripping device on a supporting side or a top side has the advantage that, in accordance with the requirements, a simply designed and thus economical gripping device can be used, since only one side of the container is gripped.

The design of the gripping device such that the container can be gripped on the supporting side and the top side has the advantage that the gripping of the container can be realized more reliably, whereby a more reliable operation, and thus a higher throughput capacity, is obtainable.

Quite particularly preferably, the gripping device comprises a first gripper arm device for gripping the top side. Alternatively or additionally, the gripping device has a second gripper arm device for gripping the supporting side.

The design of the gripping device by means of gripper arm devices has the advantage that a gripping of the container is possible at sufficient distance from the fill opening or from closure means such as adhesive strips or seams of the container. For instance, containers frequently have adhesive strips for closing the container after the packing, wherein a region of the container is shaped, in particular is folded, such that the fill opening can be closed. In order to enable reliable gripping of the container by means of the gripping device, it is advantageous to position gripping means of the gripping device on that side of the closing device which is facing away from the fill side, which is advantageously enabled by means of gripper arm devices.

Preferably, the detection device is configured as a distance measuring device, such that a distance measurement can be conducted between the first gripper arm device and the second gripper arm device.

This has the advantage that the distance measurement between the first gripper arm device and the second gripper arm device is realized such that the distance between these two gripper arm devices is measured, which is reliably adjustable and calibratable. If, during operation, the first gripper arm device and the second gripper arm device grip the container on the top side and the supporting side, then these two gripper arm devices grasp the container such that, given appropriate arrangement of the distance measuring device, the measured distance is changed by the grasped container, whereby the detection of the position of the container is enabled, since the position of the gripper arm devices as a function of time is known.

Particularly preferably, the detection device is disposed on that region of the first gripper arm device and/or of the second gripper arm device which is facing toward the container. In particular, the detection device is disposed adjacent to at least one gripping means.

By a "gripping means" is understood, within the meaning of the present application, a device for gripping the container, such as a clamp or a suction cup.

This has the advantage that the detection of the position of the container can be performed still more reliably, since the detection device is not covered by the gripper arm devices.

Quite particularly preferably, the gripping device has at least one pneumatic gripping means. The pneumatic gripping means is configured, in particular, as at least one suction cup.

The use of a pneumatic gripping means has the advantage that gripping means of this type, such as suction cups, enable reliable operation and, in particular, in the bagging of flour, fulfill the hygiene requirements for the processing of foods.

Preferably, the gripping device is configured such that the fill side of the container is movable by means of the positioning device into a defined alignment. In particular, the container is movable into such an alignment that, after the transport of the container to the bagging device by means of the transport device and the opening of the container by means of the container opening device, the sectional plane through the fill opening is disposed substantially perpendicular to the middle direction of feed of the bulk material into the container. In other words, the position of the container is correctable by means of the positioning device such that, during the transport and opening of the container, no further corrections of the position are necessary.

This has the advantage that the container, in accordance with the respective requirements, which can be filed, for instance, in a central computing unit, can be positioned for the respective application. This alignment of the container, in which the sectional plane through the fill opening lies substantially perpendicular to the middle direction of feed of the bulk material through the fill opening after transport and opening of the container, has the advantage that the transport device and/or the container opening device can be designed more simply without further positioning devices, which makes the apparatus more reliable and more economical.

Particularly preferably, the alignment of the container on and/or in the supply device can be performed by means of the gripping device prior to the transport of the container by means of the transport device. In particular, the gripping device comprises the positioning device.

This has the advantage that the transport from the supply device to the bagging device thereby becomes more reliable, because, for instance, a collision of an inaccurately positioned container with parts of the apparatus, in which collision the container is possibly detached from the gripping device, can be avoided.

Quite particularly preferably, the first gripper arm device comprises at least two first gripper arms. Alternatively or additionally, the second gripper arm device comprises at least two second gripper arms. The two first gripper arms and/or the two second gripper arms are substantially positionable relative to one another for the alignment of the container. In particular, on the two first gripper arms and/or on the two second gripper arms are disposed gripping means, which are positionable relative to one another, preferably as a function of the detected position.

In particular, respectively the two first gripper arms and/or the two second gripper arms are disposed parallel to one another and are displaceable substantially parallel to one another; as a result, a rotational positioning of the container is possible for alignment in the supply device.

In particular, on the two first gripper arms and/or on the two second gripper arms, a detection device is disposed. The arrangement of two detection devices on the two first gripper arms and/or two second gripper arms has the advantage of the simple design of the detection devices for detection of the position of the container by means of the spaced apart detection devices, which is operationally reliable.

Preferably, the detection device is respectively configured as a distance measuring device, in particular as an acoustic sensor and preferably as an ultrasonic sensor, or as an optical sensor; by means of the known information with respect to the position of the detection device on the gripping device, the time-dependent position of the gripping device and the respective time of detection of the edge of the container by the detection device, the position of the container on the supply device is able to be determined.

The design of the gripper arm devices with respectively two gripper arms and corresponding detection devices has the advantage that a gripping device of simple design and an operationally reliable alignment of the container is thereby enabled.

Preferably, the two first gripper arms and the two second gripper arms are positionable substantially simultaneously with one another. In particular, one of the first gripper arms grips the container on the top side and one of the second gripper arms grips the container on the supporting side, in particular at substantially opposite positions. Further particularly, the second of the first gripper arms and the second of the second gripper arms grips the container on the top side and on the supporting side substantially at opposite positions.

This has the advantage that the positioning during operation becomes more reliable and the likelihood of detachment of the container from the gripping device is lessened.

Particularly preferably, the supply device has at least one recess, such that the container is grippable on the supporting side by means of the gripping device.

In particular, the supply device comprises at least two rails and preferably at least three rails, which are spaced apart such that the gripping device can reach in between the rails.

This has the advantage that the supporting side of the container is reliably reachable and grippable by the gripping device.

Quite particularly preferably, the gripping device is positionable by means of a swivel motion, and in particular a translatory motion, of the transport device in the bagging device.

This has the advantage that a simply structured and reliably working mechanism is enabled in order to position the gripping device, and thus the container, in the bagging device, in particular downstream of a filler neck of the bagging device.

A further aspect of the present invention relates to an apparatus for packing bulk material into a container. In particular, an apparatus as previously described is used. The apparatus comprises a gripping device for gripping a substantially closed and empty container. In particular, the container is grabbed from a supply device. In particular, the apparatus comprises a transport device for transporting the container to a bagging device. The apparatus further comprises a container opening device for opening the container. At least one opening parameter of the container opening device for opening the container is controllable and/or regulatable. Opening parameters are, in particular, an opening time, an opening speed or an opening acceleration, or any chosen combinations thereof.

This design of the apparatus has the advantage that, as a result of the control and/or regulation of the opening of the container, the operation of the apparatus becomes more reliable, since the likelihood of detachment of the container from the gripping device is minimized, in contrast to the prior art. In the prior art, the opening is frequently realized by the container opening device being shuttled to and from between an open position and a closed position by means of a pneumatic system, whereby, for instance, shocks can arise. These shocks are advantageously avoided with the control and/or regulation of the opening and thus the operation becomes more reliable.

Preferably, the gripping device has a first gripper arm device for gripping a top side of the container and a second gripper arm device for gripping a supporting side of the container. The first gripper arm device and the second gripper arm device are positionable relative to each other, by means of the container opening device, for opening of the container. In particular, the container is gripped by means of the gripping device at opposite positions on the top side and the supporting side. In particular, the opening of the container, given a relative positioning of the first gripper arm device and of the second gripper arm device, can be realized substantially parallel to a sectional plane through the fill opening of the container.

The opening of the container by means of the gripping device has the advantage of simple design of the container opening device and reliable operation.

Particularly preferably, the container opening device has a pretensioning device for pretensioning the first gripper arm device and the second gripper arm device toward each other and/or against each other. The apparatus further has a drive for opening of the container. In particular, the drive is configured as an electric drive, as a pneumatic drive or a hydraulic drive.

By a "pretensioning device" is understood, within the meaning of the present application, a pretensioning of the two gripper arm devices toward each other or against each other.

By the term pretensioning "toward each other" is understood, within the meaning of the present application, a force application such that the first gripper arm device and the second gripper arm device are moved closer together. By the term a pretensioning "against each other" is understood, within the meaning of the present application, a force application such that the first gripper arm device and the second gripper arm device are moved away from each other.

The design of the container opening device with a pretensioning device, in which the pretensioning is surmounted or utilized by a drive to open the container, has the advantage that abrupt movements of the container opening device are substantially avoidable, so that the operation is more reliable. Moreover, a design of this type is simple to produce, which is economical.

For instance, the first gripper arm device and the second gripper arm device can be forced apart by means of the container opening device comprising the pneumatic pretensioning device, i.e. can be pretensioned against each other; a relative positioning of the first gripper arm device and of the second gripper arm device away from each other is prevented by a positionable stop; this stop can be positioned by means of the drive, whereby a controllable and/or regulatable opening of the container is achievable; in this design, advantageously only a weak drive is necessary, which is economical, since the pneumatic pretensioning device supports the opening motion; for closing of the container opening device, the pretensioning can, in particular, be switched off.

Quite particularly preferably, the gripping device is designed such that the container, which rests on the supply device, is grippable on a supporting side and/or a top side by means of the gripping device.

Preferably, the gripping device has at least one pneumatic gripping means and, in particular, at least one suction cup.

Particularly preferably, the supply device has recesses, such that the container is grippable on the supporting side by means of the gripping device.

Quite particularly preferably, the gripping device is positionable by means of a swivel motion and, in particular, a transport motion of the transport device in the bagging device.

These previously described designs have the advantages which have already been set out earlier.

Preferably, the opening acceleration is controllable and/or regulatable by means of a control and/or regulating device such that, for opening of the container, the opening acceleration in a first phase of the opening motion is adjustable to a first opening acceleration smaller than a second opening acceleration in a chronologically (in particular directly) following second phase of the opening motion.

This has the advantage that, since the opening acceleration at the start of the opening motion can be set lower than in a chronologically later phase of the opening motion, the likelihood of detachment of the container from the gripping device is lessened. The selection of the phases chronologically directly one after the other has the advantage that the opening time can be minimized for a highest possible throughput through the apparatus.

Preferably, the opening speed or the opening acceleration of the container opening device is controllable and/or regulatable as a function of the holding force with which the container is held by means of the gripping device. In particular, the holding force is determinable. The gripping device is preferably configured as a pneumatic gripping means, in particular as at least one suction cup.

The control or regulation of the opening speed or the control or regulation of the opening acceleration of the container opening device as a function of the holding force has the advantage that the likelihood of detachment of the container from the gripping device can be minimized; for instance, a control can be realized in dependence on the used container or the used gripping device. A determination of the holding force and a regulation of the opening speed or of the opening acceleration as a function of the determined holding force can still further minimize the likelihood of detachment of the container from the gripping device; for instance, the determined holding force can vary between successively gripped containers, whereupon the opening speed or the opening acceleration can be increased or reduced without user intervention, whereby the reliability and the throughput can advantageously be increased.

Preferably, the gripping device comprises a holding force sensor for determining the holding force. In particular, the holding force sensor is configured as a pressure sensor.

The configuration of the holding force sensor as a pressure sensor has the advantage that, by means of the pressure sensor, a drop in pressure in the pneumatic gripping means can be reliably determined, wherein the drop in pressure signifies a reduction in the holding force.

Alternatively, the holding force can, of course, also be determined by means of a pressure sensor; for instance, a force sensor can be disposed on a gripper by which the container is clamped, wherein the clamping force is determinable by means of the force sensor.

An additional aspect of the present invention relates to a method for packing bulk material into a container. This method is implemented, in particular, with an apparatus as previously described. The method comprises the step of providing at least one container, in particular a separated container, in a supply device. In other words, in particular precisely one container is provided in the supply device, for instance by an operator. After this, the container is gripped by means of a gripping device. In a next step, the container is transported to a bagging device by means of a transport device. The method further comprises the step of opening the container by means of a container opening device before the bulk material is packed into the container in the bagging device.

The opening of the container can take place before, during or after the transportation of the container.

Optionally, prior to the gripping of the container, a detection of the position of the container on and/or in the supply device is realized by means of a detection device. Following the detection and, in particular, gripping, a positioning and, in particular, alignment of the container is realized by means of a positioning device.

Further optionally or additionally, the opening of the container is realized by means of the container opening device such that at least one opening parameter of the container opening device is controlled and/or regulated. In particular, an opening time, an opening speed or an opening acceleration, or any chosen combinations of the opening parameters, are controlled and/or regulated. At least one of the optional steps of detecting and positioning the container and the optional step of opening the container is performed by means of control and/or regulation of an opening parameter. Optionally, both steps can also be performed.

This method has the advantages which have been set out above.

Preferably, an opening acceleration of the container opening device for opening the container in a first phase is controlled or regulated to a first opening acceleration smaller than a second opening acceleration in a chronologically (in particular directly) following second phase.

In particular, the opening acceleration lies in the first phase within the range from $0.3 \text{ m/s}^2$ to $0.9 \text{ m/s}^2$ and in the second phase within the range from $1.5 \text{ m/s}^2$ to $2.5 \text{ m/s}^2$.

Preferably, the opening speed or the opening acceleration of the container opening device is controlled and/or regulated as a function of the holding force with which the container is held by means of the gripping device. The holding force is, in particular, determined.

A further aspect of the present invention relates to a container suitable for use in an apparatus as described above in a method as described above. The container has at least one marking, disposed on and/or in the container, which is suitable for detection of the position of the container by means of a marking detector.

The marking can be configured at least as an optical marking, a magnetic marking or a tactile marking, or any chosen combinations thereof.

An optical marking can be configured as a pattern on the container, which pattern is detectable with an optical sensor such as a camera. The pattern is preferably configured as a reticle or dot pattern, or any chosen combinations thereof. An optical marking has the advantage that the position is detectable with high accuracy.

A magnetic marking can be configured as a local magnetization, which is detectable with a standard magnet detector. For instance, the magnetic marking can be formed by arrangement of at least one, and preferably at least two magnets on and/or in the container, such that the positioning is detectable. A magnetic marking has the advantage that the detection of the position is usually barely impaired by dirt contamination.

A tactile marking can be configured as a local elevation and/or depression, varying roughness, or any chosen combinations thereof, which are detectable with a contact sensor. This has the advantage that such markings can be formed economically.

An optical, magnetic or tactile marking and the marking detector are advantageously configured such that the position of the container is detectable and this information can be used to correct the position of the container by means of the positioning device.

Figure 2:
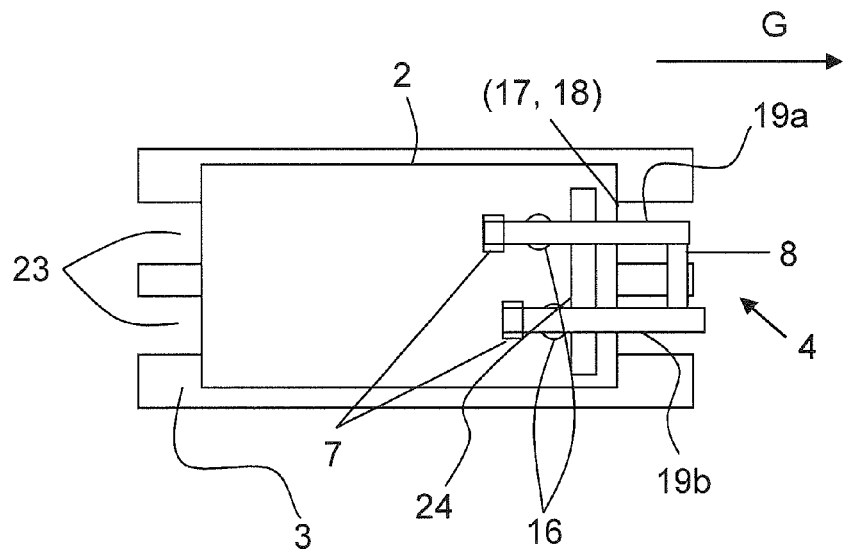
Figure 3:
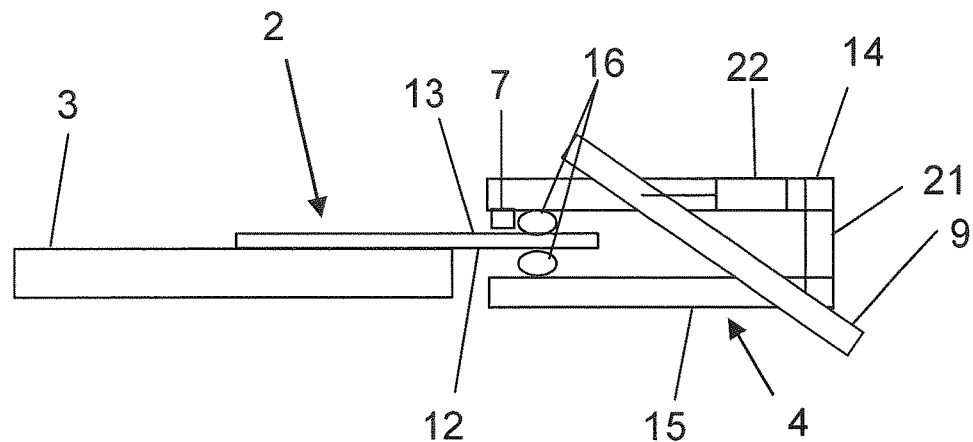
Figure 4:
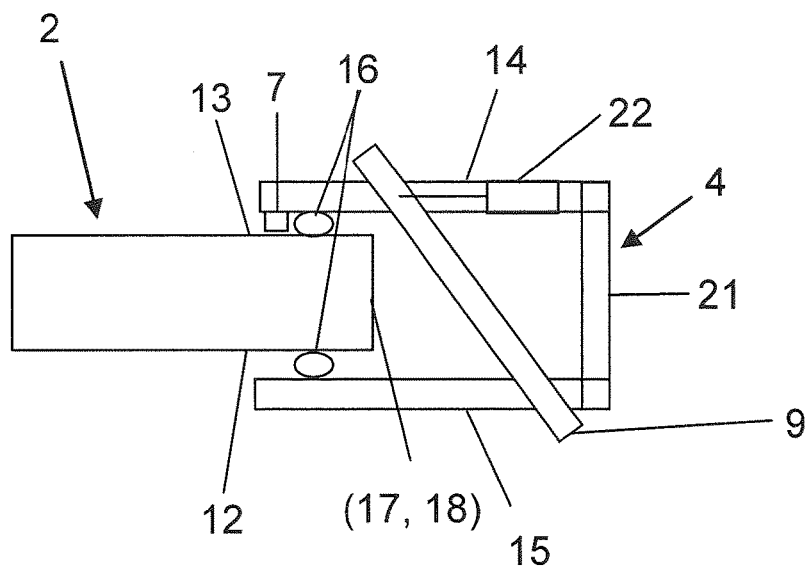
Figure 5:
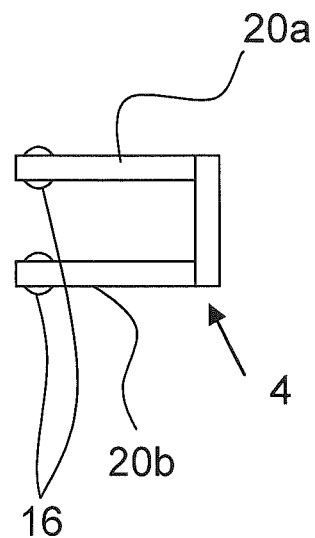
Figure 6:
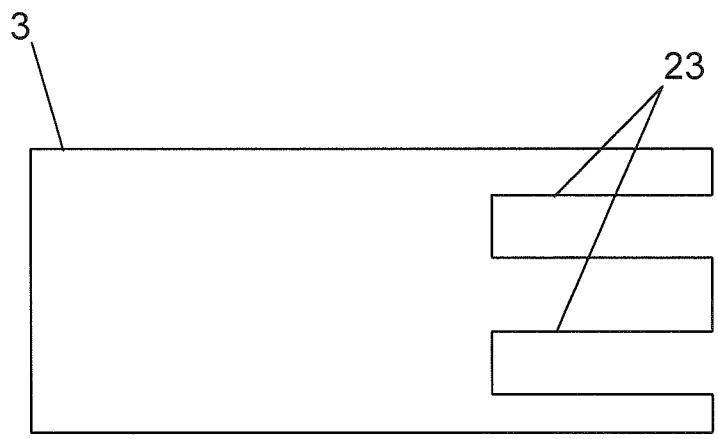
Figure 7:
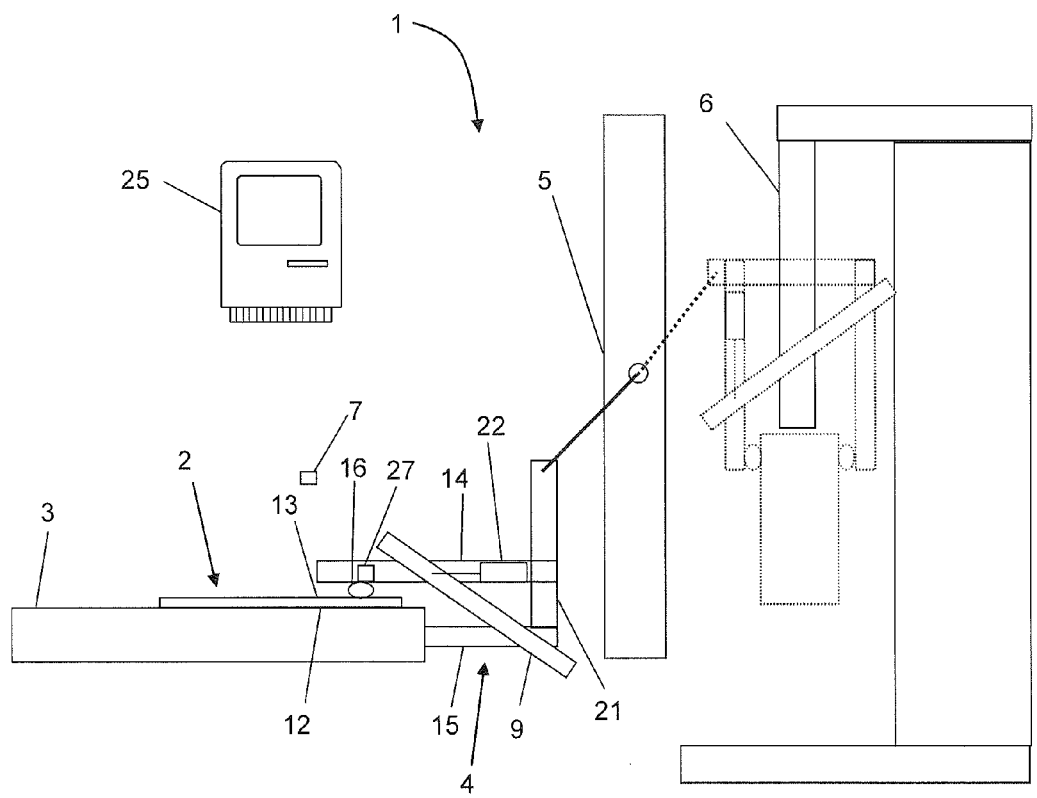
Figure 8:
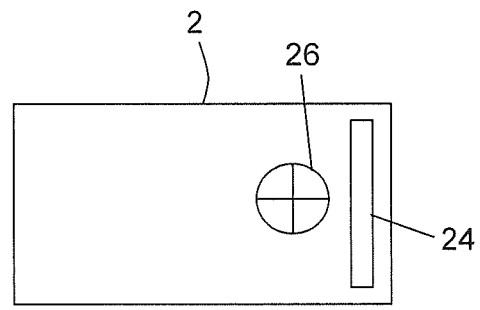
Figure 9:
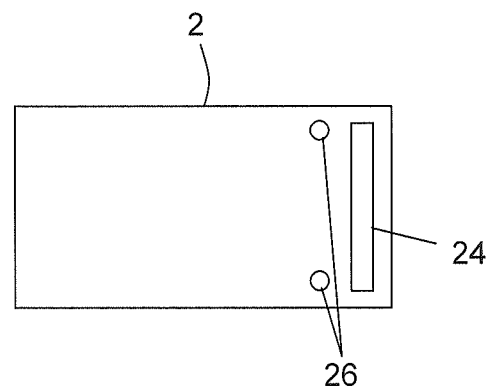
Figure 10:
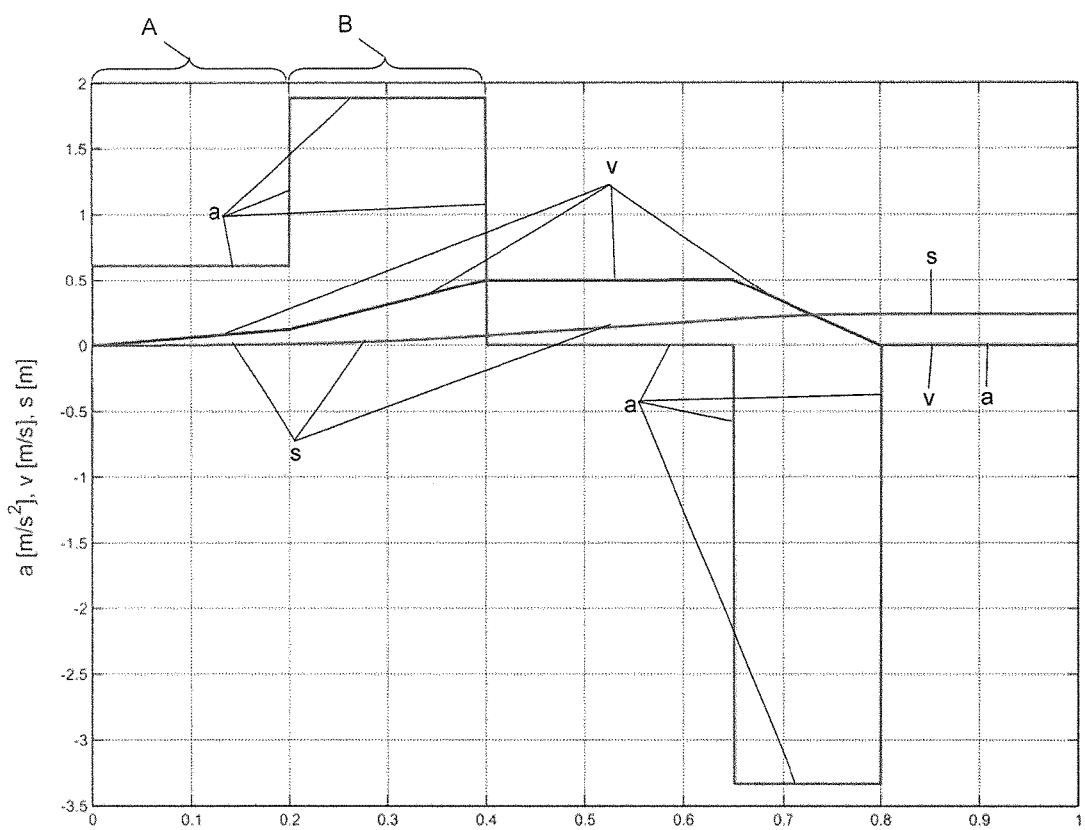

Further features and advantages of the invention are explained in greater detail below with reference to illustrative embodiments for better understanding, without the invention having to be limited to the illustrative embodiments, wherein:

FIG. 1: shows a schematic representation of an inventive apparatus for packing bulk material in a first position in a top view;

FIG. 2: shows a schematic representation of the inventive apparatus according to FIG. 1 for packing bulk material in a second position in a top view;

FIG. 3: shows a schematic representation of the inventive apparatus according to FIG. 1 for packing bulk material in a closed position in a side view;

FIG. 4: shows a schematic representation of the inventive apparatus according to FIG. 1 for packing bulk material in an open position in a side view;

FIG. 5: shows a schematic representation of an inventive gripping device in a view from below;

FIG. 6: shows a schematic representation of an alternative inventive supply device;

FIG. 7: shows a schematic representation of an inventive apparatus with bagging device;

FIG. 8: shows a schematic representation of an inventive container having a marking configured as a reticle;

FIG. 9: shows a schematic representation of an inventive container having a magnetic marking;

FIG. 10: shows a schematic representation of a movement profile of the container opening device during a container opening.

In FIG. 1, an inventive apparatus for packing bulk material is represented schematically in top view in a first position.

A substantially closed and empty container 2, in the present case a paper bag, lies on a supply device 3, onto which the container 2 has been positioned by a separating device (not shown), with which the container 2 has been removed from a container stack. The container 2 comprises a closure means 24, which is configured as an adhesive strip. After the packing of bulk material, the fill side 17 having the fill opening 18 for the bulk material can be folded over to close off the container 2.

The supply device 3 comprises two recesses 23, into which a gripping device 4 can reach in order to grip the container 2.

The gripping device 4 comprises two gripper arms 19a and 19b, as well as two further gripper arms (not visible here) for gripping the container. The gripper arms respectively comprise gripping means 16, which are configured as suction cups. Adjacent to the gripping means 16, detection devices 7 for detecting the position of the container 2 on the supply device 3 are respectively disposed. The detection devices 7 are configured as ultrasonic sensors, i.e. as distance measuring devices. The gripping device 4 further comprises a positioning device 8, with which the gripper arms can be positioned relative to one another for the positioning of the container 2. The positioning device 8 comprises a pneumatic drive (not visible here), which is known to the person skilled in the art and is connected to a control and/or regulating device (not represented), for positioning of the gripper arms relative to one another. Alternatively, a hydraulic drive can also be provided.

During operation, the container 2 is positioned on the supply device 3 by a separating device (not shown). After this, the gripping device 4 is moved along the arrow G in order to grip the container 2. By means of the detection devices 7, the position and orientation of the fill side 17 of the container 2 is detectable. The detection of the position is realized by a change in the distance measured with the ultrasonic sensors when the gripping device 4 for gripping the container 2 is moved in the direction G over the fill side 17. Based on the respective time of the measured change in distance at the two gripper arms 19a and 19b, the alignment of the container 2 can be determined.

The gripping means (not visible here) for gripping a supporting side of the container 2 are positioned in the recesses 23 between the rails of the supply device 3.

In FIG. 2, the apparatus according to FIG. 1 is represented schematically in top view in a second position.

Same reference symbols denote same features in all figures and are therefore newly explained only where necessary.

After the alignment of the container 2 has been detected and the gripping device 4 has been positioned over a top side of the container, the top side is gripped by means of the gripping means 16 configured as suction cups. After this, by means of the determined alignment of the container 2, a positioning device 8 is operated such that the gripping arms 19a and 19b are positioned relative to each other and the container 2 acquires the desired alignment. In contrast to FIG. 1, the positioning device 8 comprises an electric drive (not visible here), which is known to the person skilled in the art and is connected to a control and/or regulating device (not represented).

Following the alignment of the container 2, a transport of the gripped container 2 in a direction along the arrow G takes place.

In FIG. 3, the apparatus according to FIG. 1 is represented schematically in side view in a closed position. Unlike in FIG. 1, the detection devices 7 are configured as photoelectric sensors. The container 2 is gripped and positioned by means of a first gripper arm device 14 and a second gripper arm device 15 on the supporting side 12 and the top side 13. The container 2 has been partially transported from the supply device 3. The first gripper arm device 14 and the second gripper arm device 15 respectively comprise two gripper arms as represented in FIG. 1.

The gripping device 4 according to FIG. 3 comprises a pretensioning device 21 for pretensioning the first gripper arm device 14 and the second gripper arm device 15 toward each other. The pretensioning device 21 is configured as a pneumatic pretensioning device. Moreover, the gripping device 4 has a drive 22, which is configured as an electric drive. The drive 22 is configured such that, by means of a container opening device 9, the first gripper arm device 14 and the second gripper arm device 15 are positionable relative to each other for opening of the container 2. The drive 22 is operatively connected to the container opening device 9, so that the container opening device 9 is rotationally positionable.

Alternatively, the drive 22 can be operatively connected to the first gripper arm device 14 and the second gripper arm device 15 directly without a container opening device 9, wherein the positioning of the gripper arm devices relative to each other is realized by means of linear positioning by the drive 22. In this case, the drive 22 assumes the function of the container opening device 9.

In FIG. 4, the apparatus according to FIG. 3 is represented in an open position. Unlike in FIG. 3, the detection device 7 is configured as a camera, only one camera being used. From the image recorded with the camera, the position of the container 2 on the supply device (not represented here) is determined.

For opening of the container, the drive 22 is controlled such that the container opening device 9 is rotationally positioned, whereby an opening takes place. To this end, the drive 22 must surmount the force applied by means of the pretensioning device 21, whereby shocks are substantially prevented, which lessens the likelihood of detachment of the container 2 from the gripping device 4.

In FIG. 5, a gripping device 4 according to FIG. 1 is represented in a view from below. The gripping device 4 has second gripper arms 20a and 20b, on which gripping means 16, configured as grabs, are respectively disposed.

In FIG. 6, an alternative design of the supply device 3 is represented in top view. The supply device 3 has two recesses 23, into which the gripping device can reach to grip the supporting side of the container.

In FIG. 7, an inventive apparatus 1 having a bagging device 6 is represented schematically.

The gripping device 4 is represented in a first position, in which the container 2 is gripped and aligned and the container 2 rests on the supply device 3. The second gripping device 15 reaches into the recess (not visible here) of the supply device 3.

By means of a transport device 5, which is connected to the gripping device 4, the gripping device 4 with the container 2 can be positioned in the bagging device 6, as is indicated by the dashed representation. In the dashed representation, the gripping device 4 is in an open position, so that bulk material is packable into the container 2.

The pretensioning device 21 pretensions the first gripper arm device 14 and the second gripper arm device 15 against each other. The drive 22 is operatively connected to a positionable stop (not represented). The stop is configured such that the rotational positioning of the container opening device 9 is blockable. Thus the first gripper arm device 14 and the second gripper arm device 15 do not move against each other despite pretensioning by means of the pretensioning device 21. Through positioning of the stop by means of the drive, an opening of the first gripper arm device 14 and of the second gripper arm device 15 can be mutually controlled and/or regulated.

For the control and/or regulation, the apparatus 1 comprises a control and/or regulating device 25, which is configured as a computer. The control and/or regulating device 25 is operatively connected to the devices to be controlled and/or regulated. In the present case, this operative connection is of wireless configuration. Alternatively, the control and/or regulating device 25 can be operatively connected by means of a tethered data line, or other means known to the person skilled in the art, to the devices to be controlled and/or regulated.

A detection device 7 is configured as a camera, which is not connected to the gripping device 4. A marking configured as a reticle is disposed on the container such that it is not visible here. Prior to the gripping of the container 2, the alignment of the reticle is determined by means of the camera. This determined alignment is used to correct the position of the container 2 by means of the positioning device (not visible here).

The gripping device 4 has a pressure sensor 27 for measuring the pressure in the gripping means 16, configured as suction cups. From the measured pressure, the holding force can be determined and an opening speed or an opening acceleration can be controlled and/or regulated.

In FIG. 8, a container 2 having a marking 26 configured as a reticle is represented, as is used in the apparatus according to FIG. 7.

In FIG. 9, a container 2 having markings 26 configured as two magnets is represented. On the basis of the magnetic field strength measured with a magnetic field detector, the alignment of the container 2 can be determined and corrected.

In FIG. 10, a movement profile of a container opening of a container opening device is represented. The opening acceleration is denoted by a, the opening speed by v and the opening path by s.

At the time t=0s, the container opening device is closed (a=0 m/s$^2$, v=0 m/s, s=0 m). After this, the container opening device is controlled in a first phase A to a first opening acceleration a=0.6 m/s$^2$. In a chronologically directly following second phase B, the container opening device is controlled to a second opening acceleration a=1.9 m/s$^2$. After this, the opening speed v is kept constant at 0.5 m/s for about 2.5 s. Next a braking takes place, wherein at about t=0.8 s the opening motion is terminated once an opening path s=0.25 m has been covered. From about t=0.8 s, the opening speed amounts to v=0 m/s and the opening acceleration to a=0 m/s$^2$.

The invention claimed is:

1. An apparatus for packing bulk material into a container having a fill opening disposed in a fill side, the apparatus comprising:
    a supply device for the container,
    a gripping device for grabbing the substantially dosed and empty container from the supply device,
    a detection device for detecting the position of the container on and/or in the supply device,
    wherein the detection device is configured as a distance measuring device, and
    a positioning device for positioning the container as a function of a distance measured by the detection device.

2. The apparatus as claimed in claim 1, wherein the gripping device has a first gripper arm device for gripping the top side and/or a second gripper arm device for gripping the supporting side.

3. The apparatus as claimed in claim 2, wherein the detection device is configured such that a distance can be measured between the first gripper arm device and the second gripper arm device.

4. The apparatus as claimed in claim 2, wherein the detection device is disposed on that region of the first gripper arm device and/or of the second gripper arm device which is facing toward the container.

5. The apparatus as claimed in claim 4, wherein the detection device is disposed on that region of the first gripper arm device and/or of the second gripper arm device which is adjacent to at least one gripping means.

6. The apparatus as claimed in claim 2, characterized in that the first gripper arm device comprises at least two first gripper arms and/or the second gripper arm device comprises at least two second gripper arms, wherein the two first gripper arms and/or the two second gripper arms are positionable relative to one another for the positioning of the container.

7. The apparatus as claimed in claim 6, wherein the two first gripper arms and the two second gripper arms are positionable substantially simultaneously with one another.

8. The apparatus as claimed in claim 6, wherein the two first gripper arms and/or the two second gripper arms are positionable substantiality parallel to one another, for the positioning of the container.

9. The apparatus as claimed in claim 1, wherein the gripping device is configured such that the fill side of the container is movable by the positioning device into a defined alignment.

10. The apparatus as claimed in claim 9, wherein after transporting of the container to a bagging device by a transport device and opening of the container by a container opening device, the sectional plane through the fill opening is disposed substantiality perpendicular to a median direction of feed of the bulk material into the container.

11. The apparatus as claimed in claim 10, wherein the gripping device comprises a holding force sensor for determining a holding force with which the container is held by the gripping device, and
    the apparatus further comprises the container opening device for opening the container,
    wherein at least one opening parameter of the container opening device for opening the container is/are controllable and/or regulatable as a function of the holding force.

12. The apparatus as claimed in claim 11, wherein the gripping device has a first gripper arm device for gripping a top side and a second gripper arm device for gripping a supporting side, wherein the first gripper arm device and the second gripper arm device are positionable relative to each other, by the container opening device, for opening of the container.

13. The apparatus as claimed in claim 12, wherein the container opening device has a pretensioning device for pretensioning the first gripper arm device and the second gripper arm device toward each other and/or against each other, and a drive for opening of the container.

14. The apparatus as claimed in claim 11, wherein the opening speed or the opening acceleration of the container opening device is controllable and/or regulatable as a function of the holding force.

15. The apparatus as claimed in claim 10, further comprising a control and/or regulating device which is configured to control and/or regulate an opening acceleration such that, for opening of the container, the opening acceleration in a first phase of an opening motion is adjusted to a first opening acceleration smaller than a second opening acceleration in a chronologically following second phase of the opening motion.

16. The apparatus as claimed in claim 1, wherein the positioning of the container on and/or in the supply device is performable by the gripping device prior to transporting of the container by a transport device.

17. The apparatus as claimed in claim 1, wherein the distance measuring device is selected from the group consisting of an ultrasonic sensor, an optical sensor, a marking detector, a contact measuring device and any combinations thereof.

18. The apparatus as claimed in claim 1, wherein the positioning device is for aligning the container as a function of a distance measured by the detection device.

19. A method for packing bulk material into a container, comprising the following steps:
    supplying the container in a supply device;
    gripping the container by a gripping device;

transportation of the container to a bagging device by a transport device;

opening the container by a container opening device in the bagging device prior to the packing of bulk material;

detecting the position of the container on and/or in the supply device, by a detection device configured as a distance measuring device; and positioning the container by a positioning device as a function of a distance measured by the detection device.

20. The method as claimed in claim 19, wherein
an opening acceleration of the container opening device for opening the container in a first phase is controlled or regulated to a first opening acceleration smaller than a second opening acceleration in a chronologically following second time phase.

21. The method as claimed in claim 19, wherein the opening speed or the opening acceleration of the container opening device is controlled and/or regulated as a function of a holding force with which the container is held by the gripping device.

22. The method as claimed in claim 19, wherein positioning of the container is performed by alignment of the container.

* * * * *